(12) United States Patent
Zakharov

(10) Patent No.: US 9,411,545 B1
(45) Date of Patent: Aug. 9, 2016

(54) SYNCHRONIZATION OF DIFFERENT COMMUNICATION CHANNELS ESTABLISHED BETWEEN ONE OR MORE MANAGING SERVERS AND ONE OR MORE REMOTE DEVICES

(71) Applicant: KYOCERA Document Solutions Inc., Osaka (JP)

(72) Inventor: Oleg Y. Zakharov, Concord, CA (US)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/605,929

(22) Filed: Jan. 26, 2015

(51) Int. Cl.
*G06K 15/02* (2006.01)
*G06F 3/12* (2006.01)
*G06K 15/00* (2006.01)

(52) U.S. Cl.
CPC .............. *G06F 3/1236* (2013.01); *G06F 3/121* (2013.01); *G06F 3/1206* (2013.01); *G06F 3/1209* (2013.01); *G06F 3/1225* (2013.01); *G06F 3/1286* (2013.01); *G06F 3/1287* (2013.01); *G06F 3/1288* (2013.01); *G06F 3/1292* (2013.01); *G06F 3/1294* (2013.01); *G06K 15/408* (2013.01)

(58) Field of Classification Search
None
See application file for complete search history.

(56) References Cited

U.S. PATENT DOCUMENTS

| | | | |
|---|---|---|---|
| 8,607,055 B2 | 12/2013 | Kawada | |
| 2002/0051184 A1* | 5/2002 | Fritz | H04W 76/02 358/1.15 |
| 2005/0246427 A1* | 11/2005 | Ishii | H04L 29/06 709/213 |
| 2006/0170965 A1* | 8/2006 | Ohara | 358/1.15 |
| 2007/0247395 A1* | 10/2007 | Barraclough et al. | 345/51 |
| 2009/0051962 A1* | 2/2009 | Asai et al. | 358/1.15 |
| 2010/0002253 A1* | 1/2010 | Kim et al. | 358/1.15 |
| 2011/0099272 A1* | 4/2011 | Takahashi | 709/224 |
| 2012/0062946 A1* | 3/2012 | Kitagata | 358/1.15 |
| 2012/0229832 A1* | 9/2012 | Tsujimoto | 358/1.13 |
| 2012/0243017 A1* | 9/2012 | Machida | 358/1.13 |
| 2013/0145141 A1* | 6/2013 | Han et al. | 713/2 |
| 2014/0032491 A1* | 1/2014 | Neerincx | G06F 17/30345 707/610 |
| 2014/0240753 A1* | 8/2014 | Anno et al. | 358/1.15 |
| 2014/0268236 A1* | 9/2014 | Ohara | G06F 3/1224 358/1.15 |

FOREIGN PATENT DOCUMENTS

EP    1 674 995 A2    6/2006

OTHER PUBLICATIONS

The Wikimedia Foundation, "Enterprise Service Bus", Dec. 27, 2014, available via the Internet at en.wikipedia.org/wiki/Enterprise_service_bus (last visited Jan. 26, 2015).

* cited by examiner

*Primary Examiner* — Beniyam Menberu
(74) *Attorney, Agent, or Firm* — McDonnell Boehnen Hulbert & Berghoff LLP

(57) ABSTRACT

Apparatus and methods for carrying out tasks using transactions with print devices are provided. A transaction can be opened between one or more managing servers and one or more print devices, where the transaction is associated with one or more tasks. As part of the transaction, the tasks can be performed using the managing servers and the print devices. A source device can communicate each task to one or more destination devices, where the source device can be selected from among the managing servers and the print devices, where the destination devices can be selected from among the managing servers and the print devices, and where the source device is not one of the destination devices. Each of the destination devices can communicate a reply to the communicated task. The transaction between the managing servers and the print devices can be closed.

14 Claims, 11 Drawing Sheets

US 9,411,545 B1

SYNCHRONIZATION OF DIFFERENT COMMUNICATION CHANNELS ESTABLISHED BETWEEN ONE OR MORE MANAGING SERVERS AND ONE OR MORE REMOTE DEVICES

BACKGROUND

Print devices have increased in number and geographic footprint throughout the world and have become increasingly connected to networks. These networks can include a print server. Typically, when one or more documents and/or other print data are scheduled to be printed, the print data is either directly sent to one print device, or sent to a print server.

The networks can include many print devices. Some or all of the print devices can have different features, functions, and capabilities. For example, some print devices print in color, while others do not. As another example, some print devices are equipped with duplexing hardware that allows printing on both sides of a sheet of paper, while other print devices can only print on one side of a sheet of paper.

Several different network communication protocols and channels can be used to manage and utilize large numbers of print devices. Once a print device is installed, typically the print device's specific remote network (e.g., Internet) configuration remains unchanged while the printer is in service.

SUMMARY

In one aspect, a method is provided. A transaction is opened between one or more managing servers and one or more print devices. The transaction is associated with one or more tasks. As part of the transaction, the one or more managing servers and one or more print devices perform the one or more tasks. Each task of the one or more tasks is communicated from a source device selected from among the one or more managing servers and the one or more print devices to one or more destination devices selected from among the one or more managing servers and the one or more print devices, where the source device is not one of the one or more destination devices. Each of the one or more destination devices communicates a reply to the communicated task. The transaction between one or more managing servers and one or more print devices is closed.

In another aspect, a system is provided. The system includes one or more print devices and a managing server. The managing server includes one or more processors and data storage. The data storage is configured to store computer-readable instructions that, when executed by the one or more processors, cause the managing server to perform functions. The functions include: opening a transaction between the managing server and the one or more print devices, wherein the transaction is associated with one or more tasks; as part of the transaction, performing the one or more tasks using the managing server and the one or more print devices, wherein each task of the one or more tasks is communicated from a source device selected from among the managing server and the one or more print devices to one or more destination devices selected from among the managing server and the one or more print devices, wherein each of the one or more destination devices communicate a reply to the communicated task, and wherein the source device is not one of the one or more destination devices; and closing the transaction.

In another aspect, an article of manufacture is provided. The article of manufacture includes computer-readable instructions that, when executed by one or more processors of a managing server associated with one or more print devices, cause the managing server to perform functions. The functions include: opening a transaction between the managing server and the one or more print devices, wherein the transaction is associated with one or more tasks; as part of the transaction, performing the one or more tasks using the managing server and one or more print devices, wherein each task of the one or more tasks is communicated from a source device selected from among the managing server and the one or more print devices to one or more destination devices selected from among the managing server and the one or more print devices, wherein each of the one or more destination devices communicate a reply to the communicated task, and wherein the source device is not one of the one or more destination devices; and closing the transaction.

Other aspects, embodiments, and implementations will become apparent to those of ordinary skill in the art by reading the following detailed description, with reference where appropriate to the accompanying drawings.

DETAILED DESCRIPTION

Figure 1:
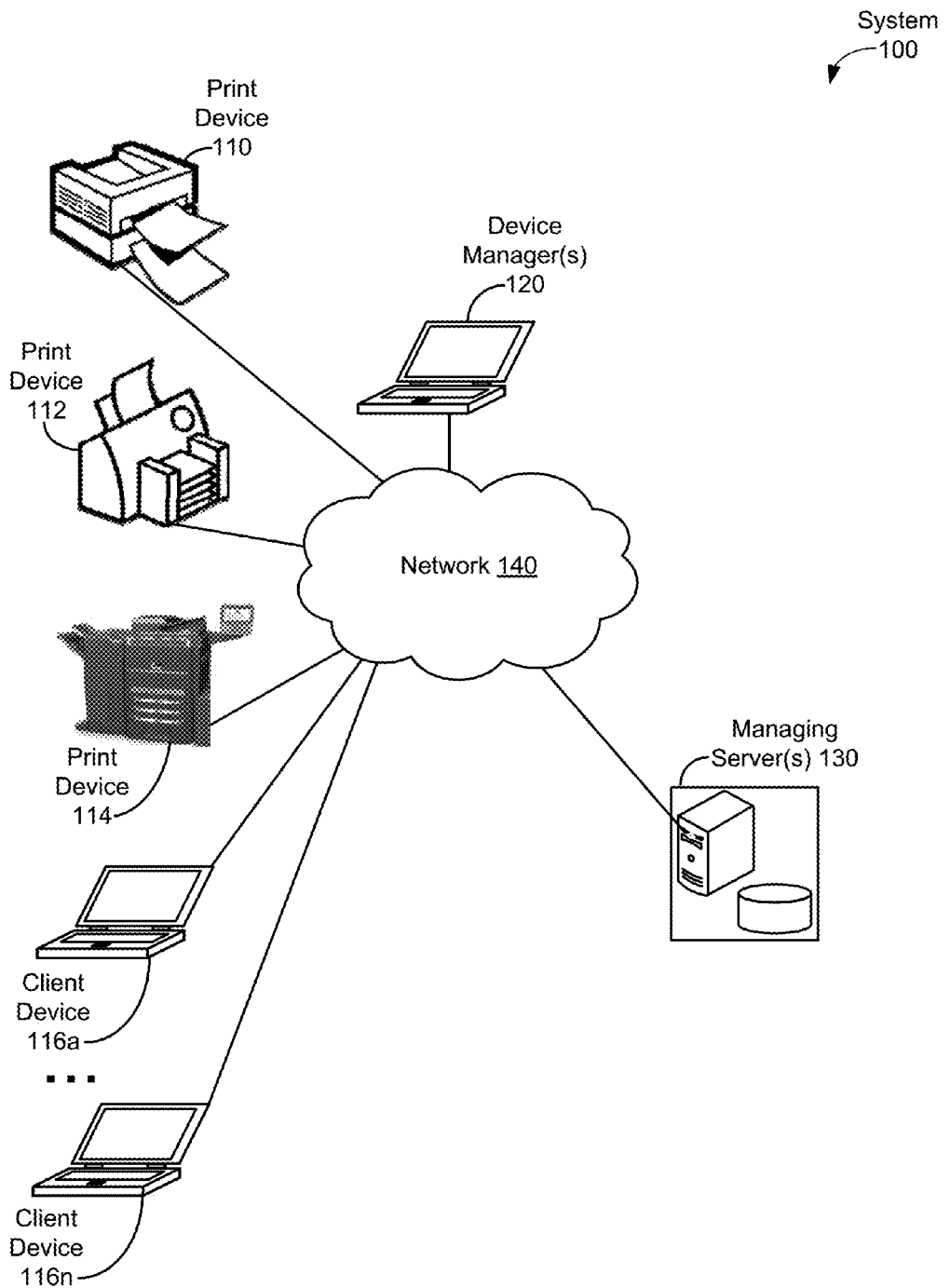
FIG. 1 is a diagram illustrating a printing system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example apparatus and methods are described herein related to performing tasks related to managing and using connected print devices and associated managing servers. In some cases, the print devices are located in a local network and may be protected by firewalls from some (or all) external network traffic. Different network protocols can be supported as part of the local network and other networks to retrieve information from all of the print devices with minimum restrictions on local (and other) network configuration; e.g., restrictions on proxies, firewalls, domain name resolution, etc. These network protocols include, but are not limited to, File Transfer Protocol (FTP), HyperText Transport Protocol (HTTP), Java Message Service (JMS), Kyocera Page Description Language (KPDL), Printer Command Language (PCL), Portable Document Format (PDF), Page Description Language (PDL), Postscript, Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), and the Message Queue (MQ) family of network protocols.

To perform these tasks, a language, such as the herein-described Printer Transaction Language, can be used. The Printer Transaction Language is based on a transaction opened between one or more source devices, such as managing servers, and one or more destination devices, such as print devices. While the transaction is open, tasks can be communicated from the source device(s) to the destination device(s). Then, when the tasks are performed by the destination devices, one or more corresponding replies to the tasks can be generated and sent from the destination device(s) to the source device(s). In some cases, one task can lead to multiple replies from a destination device; e.g., a task requesting multiple reports from the destination device. In some network examples, virtual devices can be used as source and/or destination devices. For example, suppose that a number of physical managing server devices are configured to act as one virtual managing server, e.g., when failover of some of the physical managing server devices is enabled. Then, the virtual managing server can act as a source or destination device of the Printer Transaction Language.

Communication via the Printer Transaction Language is bidirectional, allowing devices to send and receive messages related to tasks to be performed and replies to the tasks. Then, once all tasks associated with the open transaction have been performed, the open transaction can be closed by the source device(s). The Printer Transaction Language can use multiple communication channels to both support as many devices as possible and to allow the servers to process as many tasks as possible. For example, a transaction between one source device and D destination devices, D>1, can use D channels; e.g., channel 1 between the source device and destination device 1, channel 2 between the source device and destination device 2, and so on, until reaching channel D between the source device and destination device D.

Devices can support multiple communication protocols. Thus, the Printer Transaction Language can be conveyed using different protocols and channels. For example, some or all aspects of the Printer Transaction Language can be communicated using HTTP over IP. In other examples, some or all aspects of the Printer Transaction Language can be conveyed using the above-mentioned network protocols; e.g., SNMP, SMTP, MQ, etc. Part or all of the Printer Transaction Language can be encapsulated in outgoing and/or incoming messages using one or more of the multiple communication protocols. Printer Transaction Language messages can be used to tracking messages conveyed through different transport channels; for example, by having a reply to received messages include a copy of received Printer Transaction Language tasks/commands.

Transport adapters can transparently convey messages and message encoding can be shared across various available transport protocols and channels. For instance, if a message from a particular device is in a designated format, e.g., an eXtended Markup Language (XML) format, then subsequent messages to the particular device can be encoded into XML and subsequent messages from the particular device can be decoded from XML. The server can collect and identify messages retrieved from different channels to synchronize outgoing messages with related incoming messages.

The herein described Printer Transaction Language can be used to help manage large and possibly diverse networks of servers and print devices by providing a protocol for management and use of print devices. The Printer Transaction Language can be used specifically for print device related tasks; e.g., printing of test data, providing information about printing-related parameters. Thus, the Printer Transaction Language can be optimized and configured specifically for print devices and devices that manage print devices, such as managing servers, and so can be utilized to perform printing-specific tasks efficiently.

II. System Examples

FIG. 1 is a diagram illustrating printing system 100, according to an example embodiment. Printing system 100 includes print devices 110, 112, 114, client devices 116a ... 116n, one or more device managers 120, and one or more managing servers 130 interconnected using network 140. In some examples, system 100 can have more, fewer, and/or different types of client devices, device managers, and/or print devices than indicated in FIG. 1.

In an example embodiment, some or all print devices 110, 112, 114 can be connected to some or all client devices 116a-116n through one or more, possibly different, network protocols. Data can be transmitted between print devices 110, 112, 114, client devices 116a-116n, device manager(s) 120, and managing server(s) 130 over wired and/or wireless links between client devices, device managers, print devices, servers and network 140. The format of each respective data transmission between devices in system 100 can include one or more of a variety of different formats including: text formats, image formats, extensible mark-up language (XML), database tables, a flat file format, or another format.

Communications between the client devices, device managers, servers, and print devices can include: client devices 116a-116n, device manager(s) 120, and/or managing server(s) 130 sending data for print jobs and/or print job portions for printing to print devices 110, 112, 114 and print devices 110, 112, 114 sending alert, status, error, and/or other messages to client devices 116a-116n, device manager(s) 120, and/or managing server(s) 130 to inform other devices about error or other conditions of the print devices; e.g., idle, printing, sleeping, paper jam, low or out of paper, low or out of toner/ink, etc. Other communications between one or more client devices, one or more device managers, one or more servers, and one or more print devices are possible as well.

Device manager(s) 120 can execute device management software to perform device management functions for managing print devices, such as print devices 110, 112, 114. One or more managing servers 130 can be configured to store data related to print devices, such as primary identification characteristics and/or model-dependent information, provide some or all of that data upon request, and perform the herein-described functionality of a managing server. For example, a device manager, such as device manager 120 and/or 124, can formulate a query with primary identification characteristics for a print device, such as print device 110, 112, or 114, and send the query to managing server(s) 130. Managing server(s) 130 can respond to the query with a response that includes model-dependent information for a print device corresponding to the primary identification characteristics submitted in the query. Managing server(s) 130 can perform other functions as well. In some embodiments, one or more device managers 120 can perform some or all of the herein-described functionality of managing server 130 as well.

Figure 2:
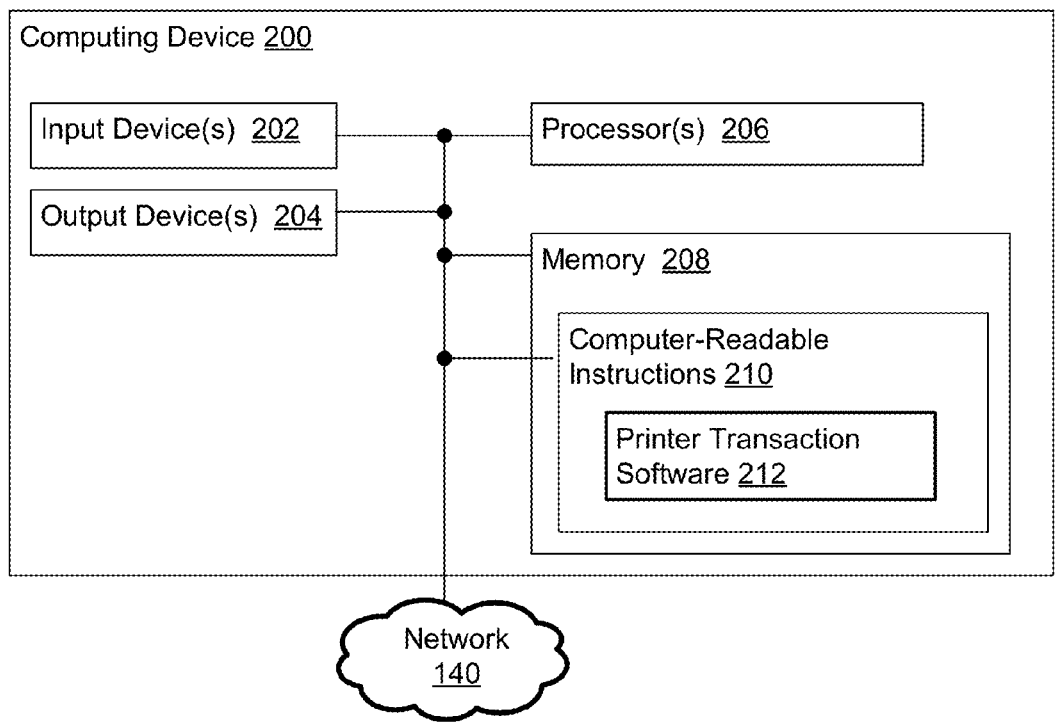
FIG. 2 is a schematic block diagram illustrating a computing device, according to an example embodiment.

FIG. 2 is a schematic block diagram illustrating computing device 200, according to an example embodiment. In some embodiments, computing device 200 can be configured to perform one or more herein-described functions of system 100, print devices 110, 112, 114, client devices 116a-116n, device managers 120, managing server(s) 130, methods 400 and 800, UI displays 610, 710, and 760 and/or part or the entire herein-described functionality related to file/message communications 310, 312, 314, network protocols including but not limited to the Printer Transaction Language, and/or scenarios 400, 500, 600, 700, 800, and 900.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include non-transitory machine-readable storage configured to store data and/or instructions. In particular, memory 208 can store machine-readable instructions 210 that, when executed by processor(s) 206, can cause a computing device to perform functions, such as but not limited to, functions of herein-described devices, networks, methods, features, and scenarios.

III. Example Printer Transaction Language

Figure 3:
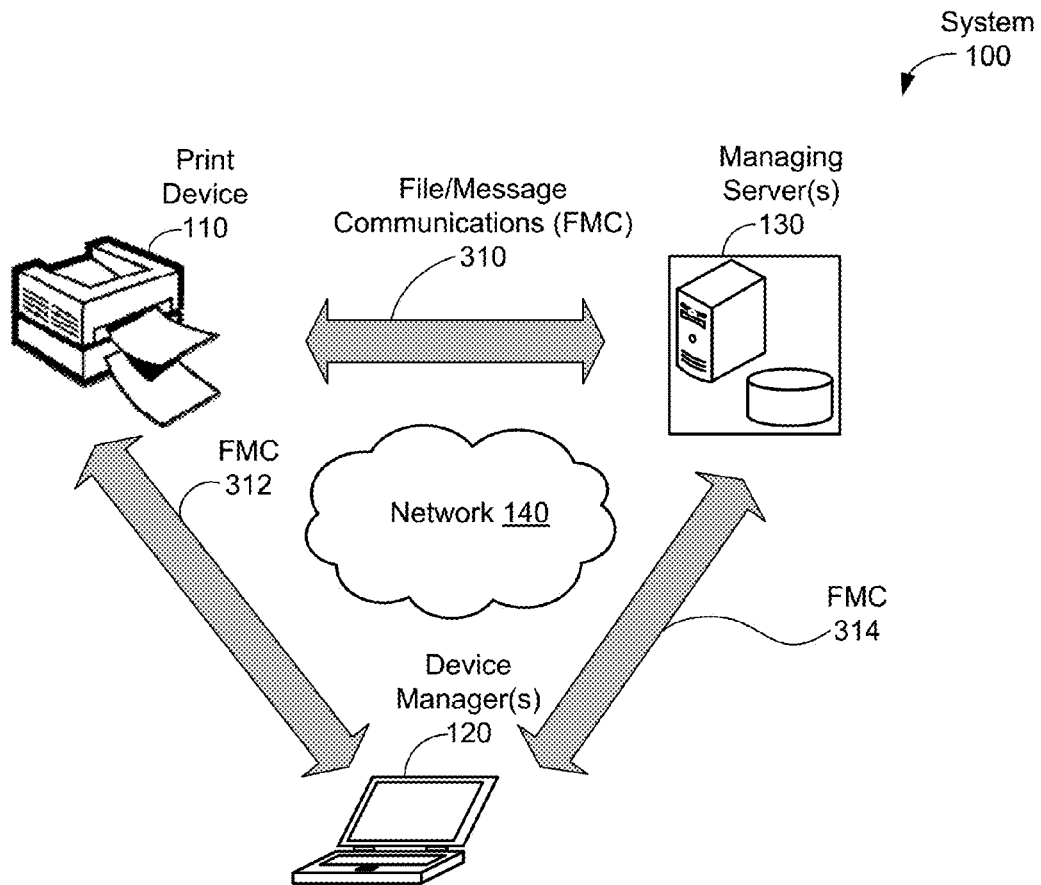
FIG. 3 illustrates an example network for printing system, according to an example embodiment.

FIG. 3 illustrates an example network for printing system 100, according to an example embodiment. FIG. 3 shows print device 110, device manager 120, and managing server 130 communicating via network 140, such as discussed above in the context of FIG. 1. In particular, FIG. 3 shows print device 110 having bi-directional file/message communications (FMC) 310 that includes files and messages conveyed with managing server 130 and having bi-directional file/message communications 312 that includes files and messages conveyed with device manager 120. Also, managing server 130 can have bi-directional file/message communications 314 that includes files and messages conveyed with device manager 120.

FIG. 3 also shows example network protocols that can be used for incoming and outgoing communications included in file/message communications 310, 312, and/or 314. Example incoming network protocols include, but are not limited to, HTTP/SOAP, JMS, FTP, SMTP, one or more file-based protocols, one or more Page Description Languages (PDLs) such as KPDL, PCL, PDF, etc., and the herein-described Printer Transaction Language. Also, example outgoing network protocols include, but are not limited to, HTTP/SOAP, JMS, FTP, SMTP, one or more file-based protocols, one or more Page Description Languages (PDLs) such as KPDL, PCL, PDF, etc., and a Printer Transaction Language, such as the example Printer Transaction Language discussed herein.

In the example Printer Transaction Language, a transaction can be opened up between one or more source devices and one or more destination devices using one or more OPEN messages. A device can have multiple transactions open simultaneously and can act, on a per-transaction basis, as a source device and as a destination device. For example, print device 110 could have three transactions open with managing server 130 and act as a destination device for two of the three transactions, while acting as a source device for the third, and further have a fourth transaction with device manager 120, where print device 110 acts as a destination device in the fourth transaction. Many other examples of transactions and channels are possible as well.

While a particular transaction is open, one device; e.g., the source device can send commands, as TASK messages, to one or more other devices; e.g., one or more destination device. After a particular device receives TASK message, the particular device can carry out the task specified in the TASK message and send a REPLY message in response, where the REPLY message communicates any response the particular device has to the TASK request. Then, once all tasks for a transaction are completed, a transaction can be closed using one or more CLOSE messages.

Table 1 below summarizes the example Printer Transaction Language that utilizes four messages: OPEN, TASK, REPLY, and CLOSE.

TABLE 1

1. OPEN - begin a transaction
   Format:
     OPEN id [ch] - begin a transaction identified by transaction ID id and perhaps by channel ch
   Examples:
     i. OPEN id1 - initiate a transaction whose transaction ID = id1
     ii. OPEN id2 ch - initiate a transaction whose transaction ID = id2 for channel ch
2. TASK - specification of an activity to be performed as part of the transaction
   Format:
     TASK id [ch] cmd [taskinfo] -- Initiate a task associated with transaction ID id and channel ch to perform command cmd with information taskinfo
   Examples:
     i. TASK id [ch] GET p [p2 . . . ] - Get data for printer parameter p [and p2 . . . ].
     ii. TASK id [ch] SET p x [p2 x2 . . . ] Set data for printer parameter p to value x [and for parameter p2 to x2]
     iii. TASK id [ch] REPORT t1 p [p2 . . . ] - Get data for printer parameter p [and p2 . . . ] every t1 units of time.
     iv. TASK id [ch] REPORT st1 p [p2 . . . ] - Get data for printer parameter p [and p2 . . . ] at specific time st1, where st1 = NOW can be used for an immediate report
     v. TASK id [ch] CONNECT x [x2 . . . ] - connect to device x (and x2 . . . )
     vi. TASK id [ch] DISCONNECT x [x2 . . . ] - disconnect from device x (and x2 . . . )
     vii. TASK id [ch] DOWNLOAD x f [f2 . . . ] - Download file f {f2, . . . } from device x
     viii. TASK id [ch] UPLOAD x f [f2 . . . ] - Upload file f {f2, . . . } to device x
     ix. TASK id [ch] COMPRESS f [T] - Compress file f using technique T
     x. TASK id [ch] DECOMPRESS f [T} - Decompress file f using technique T
     xi. TASK id [ch] ENCRYPT f [T] - Encrypt file f using technique T
     xii. TASK id [ch] DECRYPT f [T] - Decrypt file f using technique T
     xiii. TASK id [ch] INSTALL f [f2 . . . ] - Install software package specified by file f
     xiv. TASK id [ch] PRINT x [x2 . . . ] - print data x (x2, . . . )
     xv. TASK id [ch] PRINTFILE f [f2 . . . ] - print data from file f (f2, . . . )
     xvi. TASK id [ch] PANELIMAGE x [n] - Create file x with last n print control panel images (default = 1)
     xvii. TASK id [ch] REMOVE f [f2 . . . ] - remove file f (f2, . . .)
     xviii. TASK id [ch] RESTART - restart the device
     xix. TASK id [ch] SHUTDOWN - shut down the device
3. REPLY - response to a TASK message
   Format:
     REPLY command code [response]
     a. Command - a copy of the input command
     b. Code - one or more of:
       i. OK - successful completion
       ii. NO - unsuccessful completion
     c. Response - a result of activity in corresponding TASK message
       i. In some cases, the code is the only response; e.g., a SET
          activity can be carried out without a response
       ii. Response information can be in any format.
       iii. Example format for responses including error codes:
            ERROR x [x2 . . . ] - error code(s) x [x2 . . . ] received
4. CLOSE - end a transaction
   Format:
     CLOSE id [ch] - close a transaction identified by transaction ID id and perhaps by channel ch TABLE 1-continued Examples:
  i. CLOSE id1 - End transaction whose transaction ID = id1
  ii. CLOSE id2 ch - End transaction whose transaction ID = id2 for channel ch An OPEN message of the Printer Transaction Language can be used to initiate a transaction. As shown in Table 1 above, an OPEN message can have the following format:
  OPEN id [ch]
where id=a transaction ID and ch=a channel id.

In Table 1, optional items are shown inside square brackets. That is, an OPEN message of the Printer Transaction Language as specified in Table 1 includes the keyword OPEN and a transaction ID and may optionally include a channel ID.

Table 1 shows two examples of the OPEN message. In example (i), an OPEN message can specify a transaction ID to initiate a transaction. In example (ii) shown in Table 1, an OPEN message can specify a transaction ID and a channel to initiate another transaction.

A transaction can be associated with a transaction ID and perhaps a channel. The transaction ID can be used to distinguish each of a number of transactions; e.g., distinguishing a first transaction with a transaction ID=1 from a second transaction with a transaction ID=2. The channel can be used to by the source device(s) to distinguish between destination devices. For example, if print device 110 of FIG. 3 were to act as a source device with device manager 120 and managing server 130 acting as destination devices, then print device 110 can use a first channel, e.g., channel 1, to communicate with device manager 120 as a first destination device, and can use a second channel; e.g., channel 2, to communicate with managing server 130 as a second destination device. For a given transaction between a source device and D>0 destination devices with the given transaction having a predetermined transaction ID Pid1, if channel numbers are used, a unique channel number can be used to distinguish between each of the D destination devices for transaction Pid1; e.g., in the previous example, channel 1 corresponds to uniquely to device manager 120 and channel 2 corresponds to uniquely to managing server 130.

A TASK message of the Printer Transaction Language can specify an activity to be performed as part of the transaction. As shown in Table 1 above, a TASK message can have the following format:
  TASK id [ch]cmd [taskinfo]
where: id is a transaction ID, ch is a channel ID, cmd is a command specifying the activity for the TASK message, and taskinfo provides information about the command cmd.

Table 1 illustrates several example commands that can specify activities to be performed by a device receiving the TASK message. In other embodiments, more, fewer, and/or different commands can be specified in TASK messages than are shown above in Table 1.

A GET command of a TASK message can be used to request data for printer parameter(s) specified using taskinfo in the TASK message. For example, an example TASK message to GET data for a printer parameter "tonerlevel" from a device associated with channel 37 of transaction 12345 can be: TASK 12345 37 GET tonerlevel.

A SET command of a TASK message can be used to specify data for printer parameter(s) specified using taskinfo in the TASK message. For example, an example TASK message to specify values of printer parameter "pausetimer1" to "100" and printer parameter "pausetimer2" to "200" for a device associated with channel 37 of transaction 12345 can be: TASK 12345 37 SET pausetimer1 100 pausetimer2 200.

A REPORT command of a TASK message can be used to request data for printer parameter(s) specified using taskinfo in the TASK message at one or more specified times. Table 1 shows two example formats for REPORT commands. One REPORT command format can be used to report parameter values at regular time intervals, while the other REPORT command format can be used to report parameter values at a specific time interval. In some embodiments, the REPORT command can be used to generate a formatted output that includes the parameter values and perhaps other information; e.g., device information, timing information.

For example, an example TASK message to REPORT data for a printer parameter "pagesprinted" every 15 minutes from a device associated with channel 38 of transaction 1A can be: TASK 1A 38 REPORT 15 pagesprinted. As another example, an example TASK message to REPORT data for a printer parameter "pagesprinted" at 9 PM on Jan. 31, 2015 from a device associated with channel 38 of transaction 1A can be: TASK 1A 38 REPORT 01/31/2015 2100 pagesprinted.

A CONNECT command of a TASK message can be used to request that the device receiving the CONNECT command open a connection to one or more devices as specified using taskinfo in the TASK message. The one or more devices can be specified by device name, device address; e.g., IP address, Media Access Control (MAC) address, partially or fully qualified device name, and/or by other techniques. For example, an example TASK message to request that a device associated with channel 39 of transaction Prt123 make a connection to a device named "software1" can be: TASK Prt123 39 CONNECT software1.

A DISCONNECT command of a TASK message can be used to request that the device receiving the DISCONNECT command close a connection to one or more devices as specified using taskinfo in the TASK message. The one or more devices can be specified at least as discussed above in the context of CONNECT command. For example, an example TASK message to request that a device associated with channel 39 of transaction Prt123 close a connection to a device named "software1" can be: TASK Prt123 39 DISCONNECT software1.

A DOWNLOAD command of a TASK message can be used to request that the device receiving the DOWNLOAD command retrieve (download) one or more files from a device as specified using taskinfo in the TASK message. The device can be specified at least as discussed above in the context of CONNECT command. For example, an example TASK message to request that a device associated with channel BR444 of transaction P11 retrieve files "Part1" and "Part2" from a device named "Storage17B" can be: TASK P11 BR444 DOWNLOAD Storage 17B Part Part2.

An UPLOAD command of a TASK message can be used to request that the device receiving the UPLOAD command provide (upload) one or more files to a device as specified using taskinfo in the TASK message. The device can be specified at least as discussed above in the context of CONNECT command. For example, an example TASK message to request that a device associated with channel BR444 of transaction P11 provide a file "DatalogBR444" to device named "Storage13A" can be: TASK P11 BR444 UPLOAD Storage 13A DatalogBR444.

A COMPRESS command of a TASK message can be used to request that the device receiving the COMPRESS command attempt to reduce the storage used (compress) a file using a compression technique as specified using taskinfo in the TASK message. In some embodiments, a default compression technique can be used when taskinfo does not specify a compression technique. An example TASK message to request that a device associated with channel BR444 of transaction P11 compress a file named "BigFile" using the "ZIP3" compression technique: can be: TASK P11 BR444 COMPRESS BigFile ZIP3.

A DECOMPRESS command of a TASK message can be used to request that the device receiving the DECOMPRESS command attempt to reverse a previous COMPRESSION action (decompress) a file using a decompression technique as specified using taskinfo in the TASK message. In some embodiments, a default decompression technique can be used when taskinfo does not specify a decompression technique. An example TASK message to request that a device associated with channel BR444 of transaction P11 decompress a file named "BigFile.zip3" using the "ZIP3" compression technique: can be: TASK P11 BR444 DECOMPRESS BigFile.zip3 ZIP3.

An ENCRYPT command of a TASK message can be used to request that the device receiving the ENCRYPT command attempt to encode (encrypt) a file using an encryption technique as specified using taskinfo in the TASK message. In some embodiments, a default encryption technique can be used when taskinfo does not specify an encryption technique. An example TASK message to request that a device associated with channel BR444 of transaction P11 encrypt a file named "Secret1" using the "RSA" compression technique: can be: TASK P11 BR444 ENCRYPT Secret1 RSA.

A DECRYPT command of a TASK message can be used to request that the device receiving the DECRYPT command attempt to decode (decrypt) a file using a decryption technique as specified using taskinfo in the TASK message. In some embodiments, a default decryption technique can be used when taskinfo does not specify a decryption technique. An example TASK message to request that a device associated with channel BR444 of transaction P11 decrypt a file named "Secret1.enc" using the "RSA" compression technique: can be: TASK P11 BR444 DECRYPT Secret1.enc RSA.

An INSTALL command of a TASK message can be used to request that the device receiving the INSTALL command install software stored in one or more files specified using taskinfo in the TASK message. If multiple files are specified in the INSTALL command, then the software can be updated in the order used to specify the files. For example, an example TASK message to request that a device associated with channel C1 of transaction T1 install software in file "Drv13A" and then install software in file "Drv13B" can be: TASK T1 C1 INSTALL Drv13A Drv13B. As another example, an example TASK message to request that a device associated with channel C1 of transaction T1 install software in file "Drv13B" and then install software in file "Drv13A" (reversing the order of installation used in the previous example) can be: TASK T1 C1 INSTALL Drv13B Drv13A.

A PRINT command of a TASK message can be used to request that the device receiving the PRINT command print data specified using taskinfo in the TASK message. For example, an example TASK message to request that a device associated with channel BR444 of transaction P11 retrieve files "Part1" and "Part2" from a device named "Storage17B" can be: TASK P11 BR444 DOWNLOAD Storage 17B Part1 Part2.

A PRINTFILE command of a TASK message can be used to request that the device receiving the PRINTFILE command print data in one or more files specified using taskinfo in the TASK message.

A PANELIMAGE command of a TASK message can be used to request that the device receiving the PANELIMAGE command generate a file having a specified number of panel file images previously stored by the receiving device as specified using taskinfo in the TASK message. A panel file image can be generated by a device when a control panel of the device is used to perform one or more actions related to the device using the control panel. For example, in a scenario where a control panel of a print device is accessed and used to cancel a print job, a first panel file image can be generated when the print device's control panel is initially accessed, a second panel file image can be generated when the control panel is directed to a "cancel print job" menu of the control panel, and a third panel file image can be generated when the control panel is used to cancel the print job.

In some embodiments, such as shown in Table 1, a default number of panel file images (e.g., 1) can be stored in the specified file. For example, an example TASK message for transaction T1 to store the default number of panel file images in a file name "DefImg" can be: TASK T1 PANELIMAGE DefImg. As another example, an example TASK message for transaction T1 to store the last five panel file images in a file name "Img5" can be: TASK T1 PANELIMAGE Img5 5.

A REMOVE command of a TASK message can be used to request that the device receiving the REMOVE command delete (remove) one or more files as specified using taskinfo in the TASK message. For example, an example TASK message for a device associated with transaction T1 to delete files named "DefImg" and "Img5" can be: TASK T1 REMOVE DefImg Img5.

A RESTART command of a TASK message can be used to request that the device receiving the RESTART command reinitialize (i.e., reboot) itself. A SHUTDOWN command of a TASK message can be used to request that the device receiving the SHUTDOWN command power itself off. For example, example TASK messages to request that a device associated with transaction T1 to first reboot and then power off can be:

TASK T1 RESTART
TASK T1 SHUTDOWN

A REPLY message of the Printer Transaction Language can provide a response to a corresponding TASK message of the Printer Transaction Language. As shown in Table 1 above, a REPLY message can have the following format:

REPLY command code [response]

The command portion of the REPLY message can be a copy of part or the entire input command; that is, the corresponding TASK message. Including the copied (portion of the) corresponding TASK message in a REPLY message allows for correlation between TASK and REPLY messages by the source device. Additionally, having a copy of the TASK message embodied in the REPLY message allows the source device to verify transmission of the original TASK message.

The code portion of the REPLY message can indicate whether or not the activity was carried out successfully by the device that received the TASK message. As shown in the example of Table 1, a code of "OK" can indicate successful completion of the activity and a code of "NO" can indicate unsuccessful completion of the activity. In other embodiments, other values and/or codes can be used in REPLY messages.

The response portion of the REPLY message can include results of the activity that was prompted by the corresponding TASK message. The response portion can be in any format. For example, if the activity was "GET pagesprinted" and the value of the pagesprinted parameter is 139, then example response formats include, but are not limited to, "139", "0x8b", "pagesprinted=139", or "The value of pagesprinted at 12:35 PM on 28 Jun. 2015=139".

For some activities, the response can be null (empty)—that is, some activities do not have specified responses beyond perhaps an indication of success or failure that can be conveyed using the code portion. Some activities can lead to one or more error codes to be generated. As shown in Table 1, an example response portion for reporting error codes can be "ERROR x [x2 . . . ]", where x, x2 . . . are error codes.

As an example, suppose a source device SD1 sends the following TASK message to destination device DD1: TASK OPEN 123456 12. If the OPEN command was successfully completed by destination device DD1, an example REPLY message to be sent by DD1 in response is: REPLY OPEN 123456 12 OK, where the command portion of the REPLY message is "OPEN 123456 12", the code portion is "OK", and the response portion is null.

If the OPEN message was not successfully completed by destination device DD1, an example REPLY message to be sent by DD1 in response is: REPLY OPEN 123456 12 NO, where the command portion of the REPLY message is "OPEN 123456 12", the code portion is "NO", and the response portion is null. If the command was not successful and returned error code 73, an example response is: REPLY OPEN 123456 12 NO ERROR 73, where the command portion of the REPLY message is "OPEN 123456 12", the code portion is "NO", and the response portion is "ERROR 73" to report the error code "73" from destination device DD1 to source device SD1. Many other examples are possible as well.

A CLOSE message of the Printer Transaction Language can be used to end a transaction. As shown in Table 1 above, an CLOSE message can have the following format:

CLOSE id [ch] where id=a transaction ID and ch=a channel id.

Table 1 shows two examples of the CLOSE message. In example (i), a CLOSE message can specify a transaction ID to close a transaction. In example (ii), a CLOSE message can specify a transaction ID and a channel to initiate another transaction.

Messages of the Printer Transaction Language can be conveyed using one or more network protocols, such as, but not limited to the network protocols discussed herein. In some embodiments, some or all Printer Transaction Language messages can be conveyed by multiple protocols; e.g., a Printer Transaction Language can be conveyed in one or more TCP packets conveyed using IP.

In other embodiments, some or all Printer Transaction Language messages can be compressed, encrypted, hashed, and/or otherwise reformatted, perhaps using relatively transparent techniques. For example, software communicating Printer Transaction Language messages could automatically or otherwise be directed to compress and/or encrypt some or all outgoing Printer Transaction Language messages and/or decompress and/or decrypt some or all incoming Printer Transaction Language messages. As another example, software communicating Printer Transaction Language messages could be protected by using Secure HTTP (SHTTP) links to convey the Printer Transaction Language messages.

In still other embodiments, more, fewer, and/or different messages can be used as part of the Printer Transaction Language than discussed herein. In even other embodiments, some or all of the messages described herein as part of the Printer Transaction Language can have different formats; e.g., part or all of some or all of the messages in the Printer Transaction Language can be formatted using a binary format, a numeric format, different alpha-numeric format(s), and/or other formats. In yet other embodiments, different Printer Transaction Language message can be conveyed using different protocols; e.g., a TASK message with a GET or SET command can be conveyed, at least in part, using the SNMP protocol, while a TASK message with a DOWNLOAD or UPLOAD command can convey files at least in part using the FTP protocol. Many other examples of the Printer Transaction Language are possible as well.

IV. Example Printer Transaction Language Scenarios

Scenarios 400, 500, 600, 700, 800, and 900 involve using the Printer Transaction Language between devices of system 100 shown in FIG. 1. The Printer Transaction Language messages discussed in the context of scenarios 400, 500, 600, 700, 800, and 900 can be conveyed using one or more network protocols, such as, but not limited to the network protocols used to convey file/message communications 310, 312, 314 discussed above in the context of FIG. 3.

Figure 4:
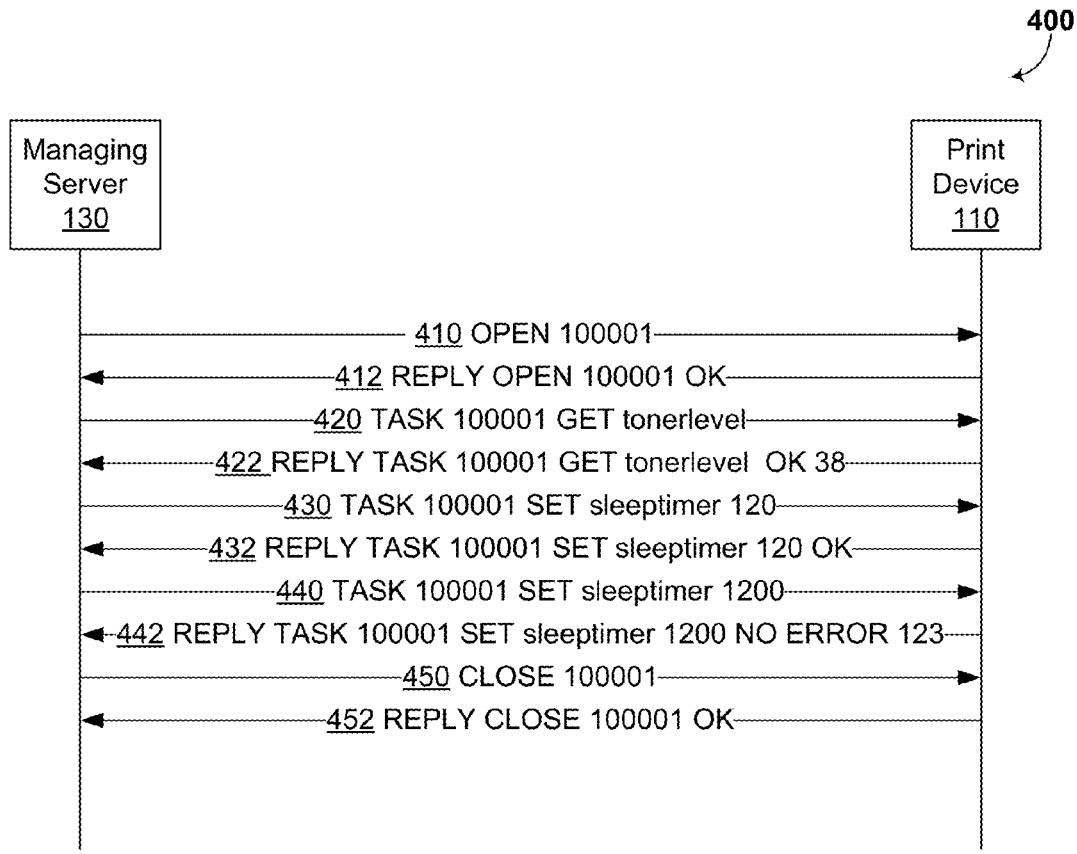
FIG. 4 is a communication flow diagram for a scenario, according to an example embodiment.

FIG. 4 is a communication flow diagram for scenario 400, according to an example embodiment. In scenario 400, managing server 130 opens transaction number 100001 to communicate with print device 110. Managing server 130 requests toner level information from print device 110. In response, print device 110 provides the requested toner level information to managing server 130. Then, managing server 130 tries to set a sleep timer of print device 112 to two different values: 120 and 1200.

Scenario 400 can begin with managing server 130 sending OPEN message 410 to print device 110 to open transaction 100001 between managing server 130 and print device 110. In response to OPEN message 410, print device 110 sends REPLY message 412 indicating that transaction 100001 was successfully opened.

Managing server 130 can send a GET command in TASK message 420 requesting print device 110 provide a value of a "tonerlevel" printer parameter. In response to TASK message 420, print device 110 sends REPLY message 422 indicating successful completion of the GET command and that the value of the tonerlevel parameter of print device 110 is equal to "38".

FIG. 4 shows that scenario 400 continues with managing server 130 sending a SET command in TASK message 430 requesting that print device 110 assign a value of "120" for a "sleeptimer" printer parameter. In response to TASK message 430, print device 110 sends REPLY message 432 indicating successful completion of the SET command and so the sleeptimer parameter of print device 110 is set to 120.

Managing server 130 then can send a SET command in TASK message 440 requesting that print device 110 assign a value of "1200" for the sleeptimer parameter. In response to TASK message 440, print device 110 sends REPLY message 442 indicating unsuccessful completion of the SET command, and that attempted SET command led to an error code of "123".

Scenario 400 can continue with managing server 130 sending CLOSE message 450 to print device 110 closing transaction 100001. In response to TASK message 450, print device 110 sends REPLY message 452 indicating that transaction 100001 was successfully closed. After REPLY message 452 is received by managing server 130, managing server 130 can close transaction 100001 and scenario 400 can end.

Figure 5:
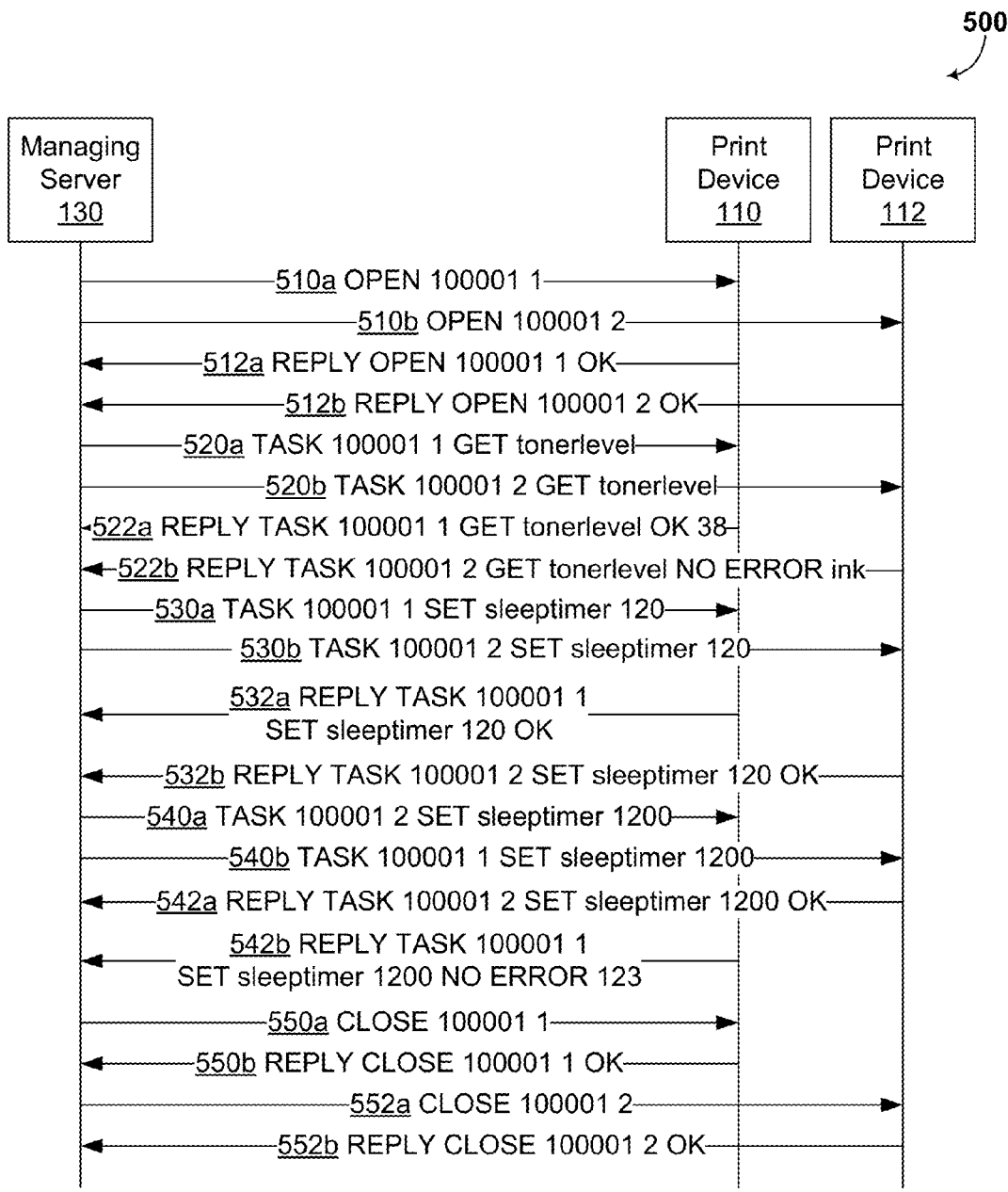
FIG. 5 is a communication flow diagram for another scenario, according to an example embodiment.

FIG. 5 is a communication flow diagram for scenario 500, according to an example embodiment. Scenario 500 is the same as scenario 400, except that two print devices are used: print devices 110 and 112. In scenario 500, managing server 130 uses channel 1 to communicate with print device 110 and uses channel 2 to communicate with print device 112.

Scenario 500 can begin with managing server 130 sending OPEN messages 510a, 510b to respective print devices 110 and 112 to open transaction 100001 between managing server 130 and respective print devices 110 and 112. As shown in FIG. 5, OPEN message 510a sent to print device 110 includes a transaction ID of "100001" and a channel of "1" and OPEN message 510b sent to print device 112 includes a transaction ID of "100001" and a channel of In response to OPEN message 510a, print device 110 sends REPLY message 512a indicating that channel 1 for transaction 100001 was successfully opened. In response to OPEN message 510b, print device 112 sends REPLY message 512b indicating that channel 2 for transaction 100001 was successfully opened.

Managing server 130 can send respective GET commands in respective TASK messages 520a, 520b requesting respective print devices 110, 112 provide respective values of the tonerlevel parameter. In response to TASK messages 520a, 520b, respective print devices 110, 112 send respective REPLY messages 522a, 522b indicating completion of the respective GET command. FIG. 5 illustrates that REPLY message 522a indicates that TASK message 520a was successful and that the value of the tonerlevel parameter of print device 110 is equal to "38" and that REPLY message 522b indicates that TASK message 520b was unsuccessful with on print device 112 with an error code of "ink".

FIG. 5 shows that scenario 500 continues with managing server 130 sending respective SET commands in respective TASK messages 530a, 530b requesting that each of respective print devices 110, 112 assign a value of "120" for the sleeptimer parameter. In response to respective TASK messages 530a, 530b, respective print devices 110, 112 send respective REPLY message 532a, 532b indicating successful completions of the SET commands on print devices 110 and 112. As such, the sleeptimer parameter of each of print devices 110 and 112 is set to 120.

FIG. 5 shows that scenario 500 continues with managing server 130 sending respective SET commands in respective TASK messages 540a, 540b requesting that each of respective print devices 110, 112 assign a value of "1200" for the sleeptimer parameter. In response to respective TASK messages 540a, 540b, print devices 110, 112 send respective REPLY messages 542a, 542b. In response to TASK message 540a, print device 110 sends REPLY message 542b indicating unsuccessful completion of the SET command, and that attempted SET command led to an error code of "123". In response to TASK message 540b, print device 112 sends REPLY message 542a indicating successful completion of the SET command. At this point of scenario 500, the sleeptimer parameter of print device 110 is set to 120, and the sleeptimer parameter of print device 112 is set to 1200.

Scenario 500 can continue with managing server 130 sending CLOSE message 550a to print device 110 closing channel 1 of transaction 100001. In response to CLOSE message 550b, print device 110 sends REPLY message 550b indicating that channel 1 of transaction 100001 was successfully closed. Managing server 130 can then send CLOSE message 552a to print device 112 closing channel 2 of transaction 100001. In response to TASK message 552b, print device 112 sends REPLY message 552b indicating that channel 2 of transaction 100001 was successfully closed. After REPLY message 552b is received by managing server 130, managing server 130 can close transaction 100001 and scenario 500 can end.

Figure 6:
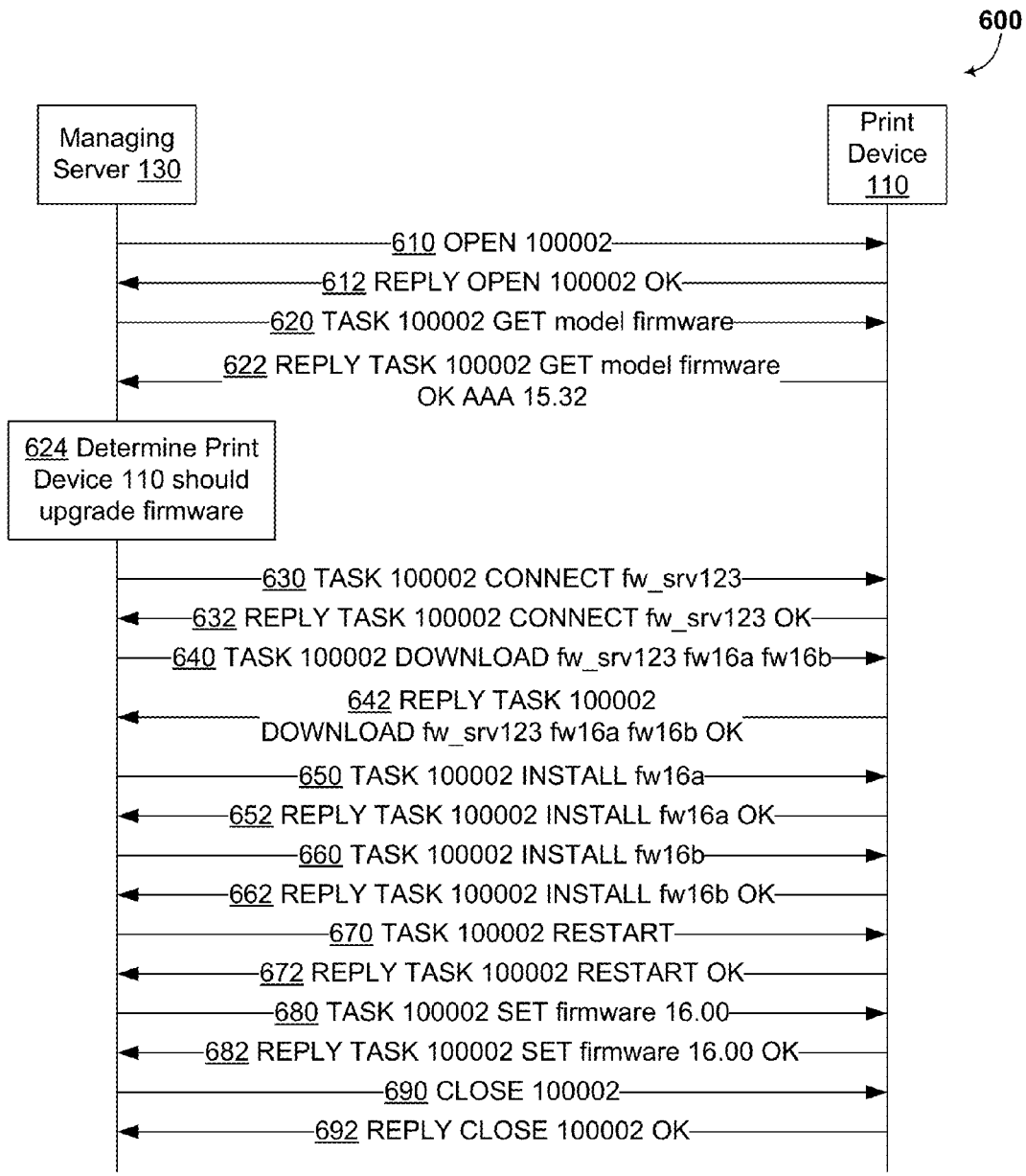
FIG. 6 is a communication flow diagram for another scenario, according to an example embodiment.

FIG. 6 is a communication flow diagram for scenario 600, according to an example embodiment. In scenario 600, managing server 130 opens transaction number 100002 with print device 110. Managing server 130 first inquires about firmware on print device 110 and then determines that print device 110 should have its firmware updated. Then, managing server 130 directs print device 110 to update its firmware. After the firmware of print device 110 is updated, transaction number 100002 is closed.

Scenario 600 can begin with managing server 130 sending OPEN message 610 to print device 110 to open transaction 100002 between managing server 130 and print device 110. In response to OPEN message 610, print device 110 sends REPLY message 612 indicating that transaction 100002 was successfully opened.

Managing server 130 can send a GET command in TASK message 620 requesting print device 110 provide a value of "model" and "firmware" printer parameters. In response to TASK message 620, print device 110 sends REPLY message 622 indicating successful completion of the GET command and that the value of the model parameter of print device 110 is equal to "AAA" and that the value of the firmware parameter of print device 110 is "15.32".

At block 624, managing server 130 can determine that firmware version 15.32 of print device 110 is out of date and its firmware should be upgraded. Scenario 600 can continue with managing server 130 sending TASK message 630 to print device 110 requesting that print device 110 establish a connection to a computing device named "fw_srv123". In response to TASK message 630, print device 110 can send REPLY message 632 indicating that a connection between print device 110 and fw_srv123 was successfully established.

FIG. 6 indicates that scenario 600 continues with managing server 130 sending TASK message 640 requesting print device 110 download two files "fw16a" and "fw16b" from the fw_srv123 device. In response to TASK message 640, print device 110 can download files fw16a and fw16b from the fw_srv123 device and send REPLY message 642 to managing server 130 indicating the successful download of the two files.

Managing server 130 then sends TASK message 650 requesting print device 110 install software from the "fw16a" file. In response to TASK message 650, print device 110 can install software from the fw16a file and send REPLY message 652 to managing server 130 indicating the successful installation of the software from the fw16a file. Scenario 600 continues with managing server 130 sending TASK message 660 requesting print device 110 install software from the "fw16b" file. In response to TASK message 660, print device 110 can install software from the fw16b file and send REPLY message 662 to managing server 130 indicating the successful installation of the software from the fw16b file.

In other scenarios related to scenario 600, rather than using two TASK messages to install the software from files fw16a and fw16b, one TASK message can be sent from managing device 130 to print device 110; e.g., TASK 100002 INSTALL fw16a fw16b. In these scenarios, print device 110 can respond to this TASK message by sending one REPLY message to managing device 130 after the software in the two files is installed.

FIG. 6 indicates that scenario 600 continues with managing device 130 sending TASK message 670 to print device 110 to request restart of print device 110. In response to TASK message 670, print device 110 can restart itself. In scenario 600, restarting of print device 110 is successful. After the restart completes, print device 110 can send REPLY message 672 to inform managing server 130 that restarting of print device 110 was successful.

Managing device 130 then sends TASK message 680 to print device 110 to request that print device 110 update the value of the firmware parameter to "16.00". In response to TASK message 680, print device 110 can set the value of the firmware parameter to 16.00 and can send REPLY message 682 to managing server 130 indicating that the firmware parameter was successfully updated.

Scenario 600 can continue with managing server 130 sending CLOSE message 690 to print device 110 closing transaction 100002. In response to CLOSE message 690, print device 110 sends REPLY message 692 indicating that transaction 100002 was successfully closed. After REPLY message 692 is received by managing server 130, managing server 130 can close transaction 100002 and scenario 600 can end.

Figure 7A:
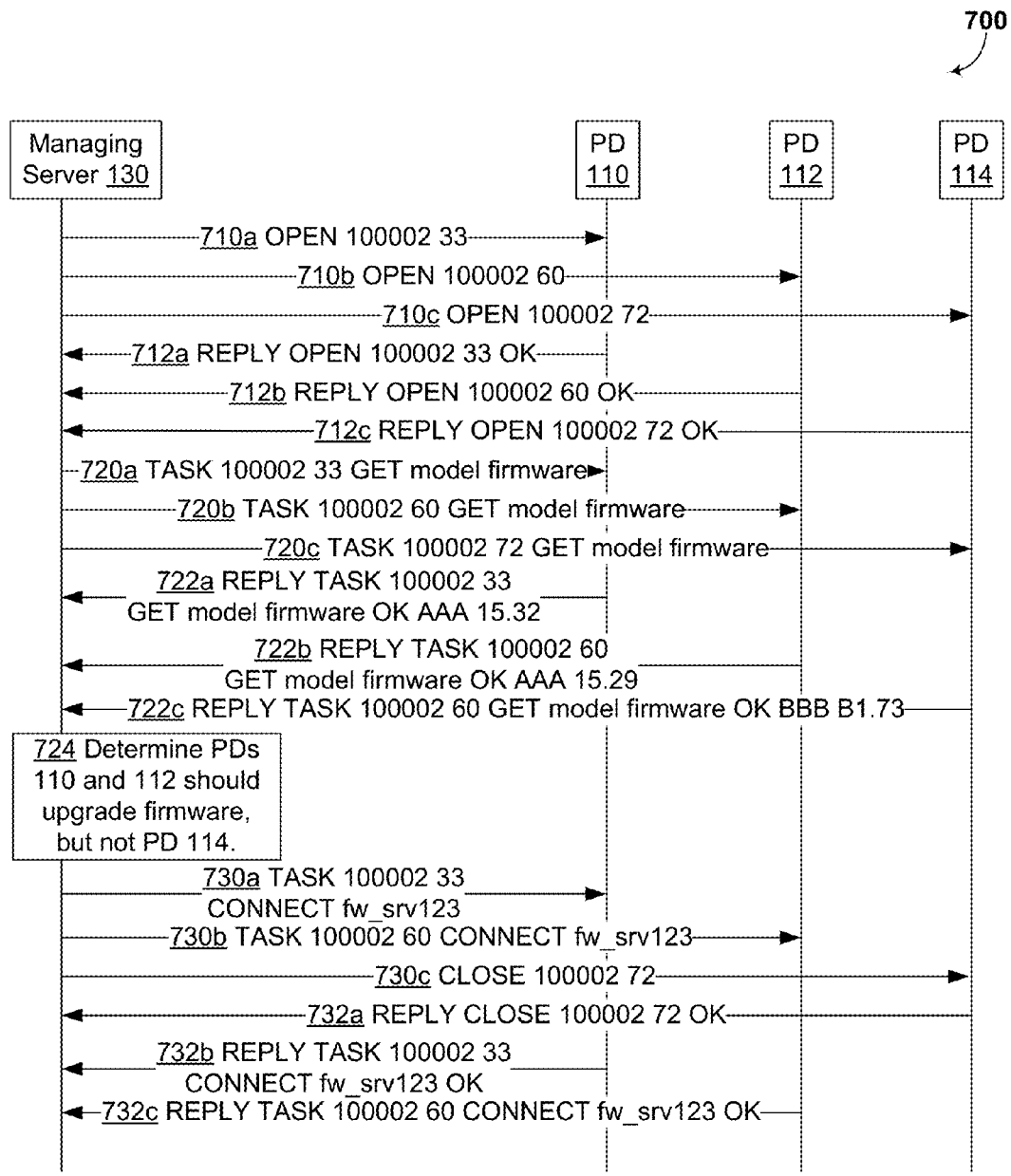
FIGS. 7A and 7B are communication flow diagrams for another scenario, according to an example embodiment.
Figure 7B:
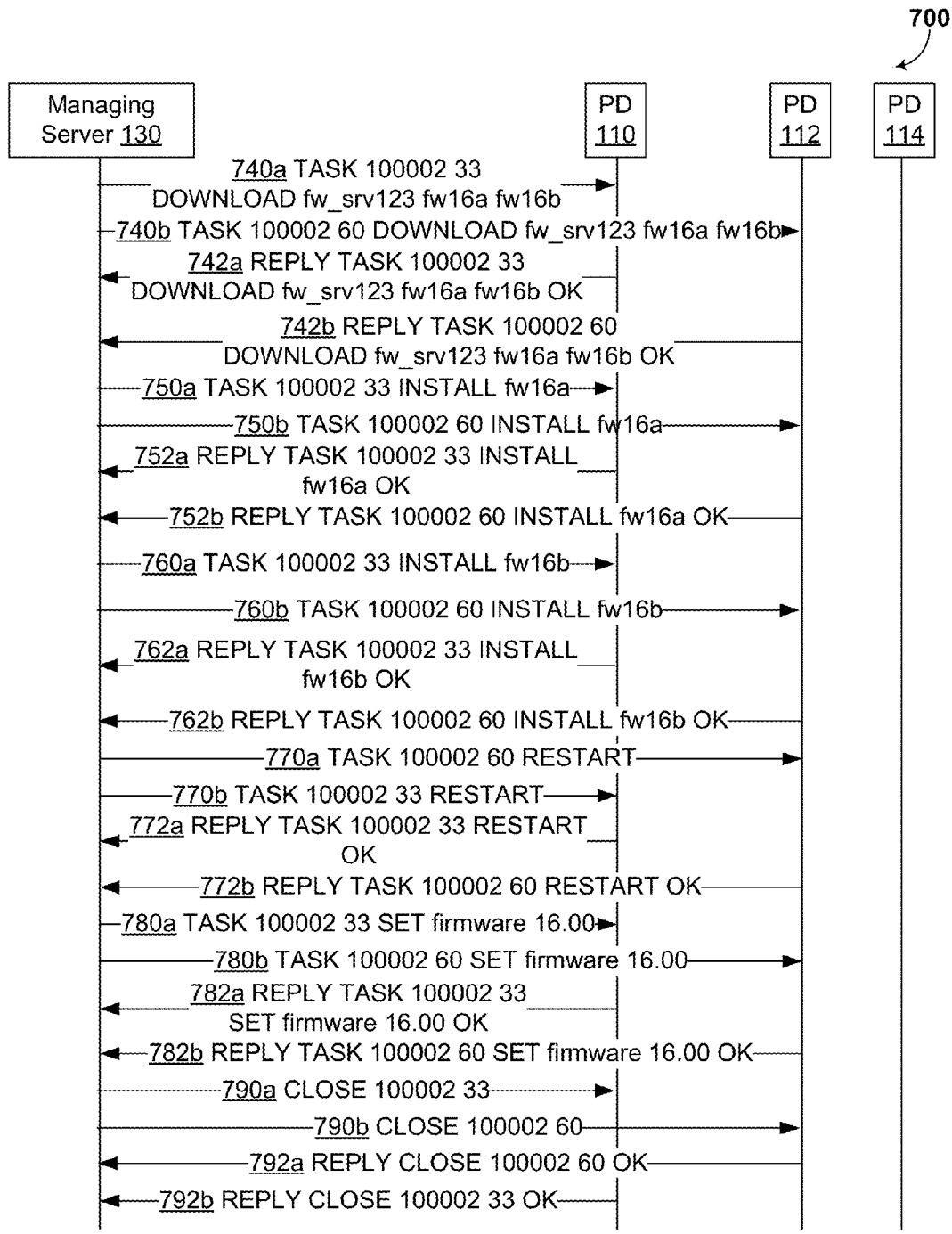

FIGS. 7A and 7B are communication flow diagrams for scenario 700, according to an example embodiment. Scenario 700 is the same as scenario 600, but with three print devices. In scenario 700, managing server 130 opens respective channels 33, 60, and 72 of transaction number 100002 with respective print devices 110, 112, 114. Managing server 130 inquires about firmware on print devices 110, 112, and 114. Managing server 130 then determines that print devices 110 and 112 should have their firmware updated, but not print device 114. Managing server 130 directs print devices 110 and 112 to update its firmware. After the firmware of print devices 110 and 112 are updated, transaction number 100002 is closed.

As shown in FIG. 7A, scenario 700 begins with managing server 130 sending respective OPEN messages 710a, 710b, 710c to print devices 110, 112, 114 to open respective channels 33, 60, 72 of transaction 100002 between managing server 130 and respective print devices 110, 112, 114. In response to respective OPEN messages 710a, 710b, 710c, print devices 110, 112, 114 send respective REPLY messages 712a, 712b, 712c to managing server 110 indicating that all of channels 33, 60, and 72 of transaction 100002 were successfully opened.

Managing server 130 can send respective TASK message 720a, 720b, 720d with respective GET commands requesting respective print devices 110, 112, 114 provide respective values of "model" and "firmware" printer parameters. In response to respective TASK messages 720a, 720b, 720c, respective print devices 110, 112, 114 send respective REPLY messages 722a, 722b, 722c indicating successful completion of the respective GET commands. In scenario 700, REPLY message 722a indicates the value of the model parameter of print device 110 is equal to "AAA" and that the value of the firmware parameter of print device 110 is "15.32", REPLY message 722b indicates the value of the model parameter of print device 112 is equal to "AAA" and that the value of the firmware parameter of print device 112 is "15.29", and REPLY message 722c indicates the value of the model parameter of print device 114 is equal to "BBB" and that the value of the firmware parameter of print device 114 is "B1.73".

At block 724, managing server 130 can determine that respective firmware versions 15.32 and 15.29 of respective print devices 110 and 112 are out of date and firmware of print devices 110 and 112 should be upgraded. Also at block 724, managing server 130 can determine that firmware version B1.73 of print device 114 is up-to-date, and so firmware of print device 114 does not have to be upgraded.

Scenario 700 can continue with managing server 130 sending respective TASK messages 730a, 730b to respective print devices 110, 112, requesting that each of respective print devices 110, 112 establish a respective connection to a computing device named "fw_srv123".

Since firmware of print device 114 is not going to be upgraded, managing server 130 determines that channel 72 of transaction 100002 is to be closed, and so sends CLOSE message 730c to print device 114 closing channel 72 of transaction 100002. In response to CLOSE message 730c, print device 114 sends REPLY message 732a indicating that channel 72 of transaction 100002 was successfully closed. After print device 114 sends REPLY message 732a and channel 72 of transaction 100002 was closed, print device 114 no longer participates in scenario 700.

In response to respective TASK messages 730a, 730b, respective print devices 110, 112 can send respective REPLY messages 732b, 732c indicating that respective connections between print device 110 and fw_srv123 and between print device 112 and fw_srv123 were successfully established.

As shown in FIG. 7B, scenario 700 continues with managing server 130 sending respective TASK messages 740a, 740b requesting that each of respective print devices 110, 112 download two files "fw16a" and "fw16b" from the fw_srv123 device. In response to respective TASK messages 740a, 740b, respective print devices 110 and 112 each download files fw16a and fw16b from the fw_srv123 device and send respective REPLY messages 742a, 742b to managing server 130 indicating the successful download of the two files to each respective print device.

Managing server 130 then sends respective TASK messages 750a, 750b requesting respective print devices 110, 112 install software from the "fw16a" file. In response to respective TASK messages 750a, 750b, each of respective print devices 110, 112 can install software from the fw16a file. Then, respective print devices 110, 112 can send respective REPLY messages 752a, 752b to managing server 130 indicating the successful installation of the software from the fw16a file on each of print devices 110, 112. Scenario 700 continues with managing server 130 sending respective TASK messages 760a, 760b requesting respective print devices 110, 112 install software from the "fw16b" file. In response to respective TASK messages 760a, 760b, each of respective print devices 110, 112 can install software from the fw16b file and subsequently can send respective REPLY messages 762a, 762b to managing server 130 indicating the successful installation of the software from the fw16b file on each of print devices 110, 112.

FIG. 7B indicates that scenario 700 continues with managing device 130 sending respective TASK messages 770b, 770a to respective print devices 110, 112 to request restart of respective print devices 110, 112. In response to respective TASK messages 770b, 770a, each respective print device 110, 112 can restart itself. In scenario 700, both print devices 110 and 112 restart successfully. After the respective restarts complete, respective print devices 110, 112 can send respective REPLY messages 772a, 772b to inform managing server 130 that the restarts of respective print devices 110, 112 were successful.

Managing device 130 then sends respective TASK messages 780a, 780b to respective print devices 110, 112 requesting that each respective print device update its value of the firmware parameter to "16.00". In response to respective TASK messages 780a, 780b, each of print devices 110, 112 can set the value of its firmware parameter to 16.00. Then, respective print devices 110, 112 can respective send REPLY messages 782a, 782b to managing server 130 as indications that the firmware parameters on print devices 110 and 112 were successfully updated.

Scenario 700 can continue with managing server 130 sending CLOSE message 790a to print device 110 closing channel 33 of transaction 100002. In response to CLOSE message 790a, print device 110 sends REPLY message 792b indicating that channel 33 of transaction 100002 was successfully closed. Managing server 130 also sends CLOSE message 790b to print device 112 to close channel 60 of transaction 100002. In response to CLOSE message 790b, print device 112 sends REPLY message 792a indicating that channel 66 of transaction 100002 was successfully closed. After REPLY message 792b is received by managing server 130, managing server 130 can close transaction 100002 and scenario 700 can end.

Figure 8:
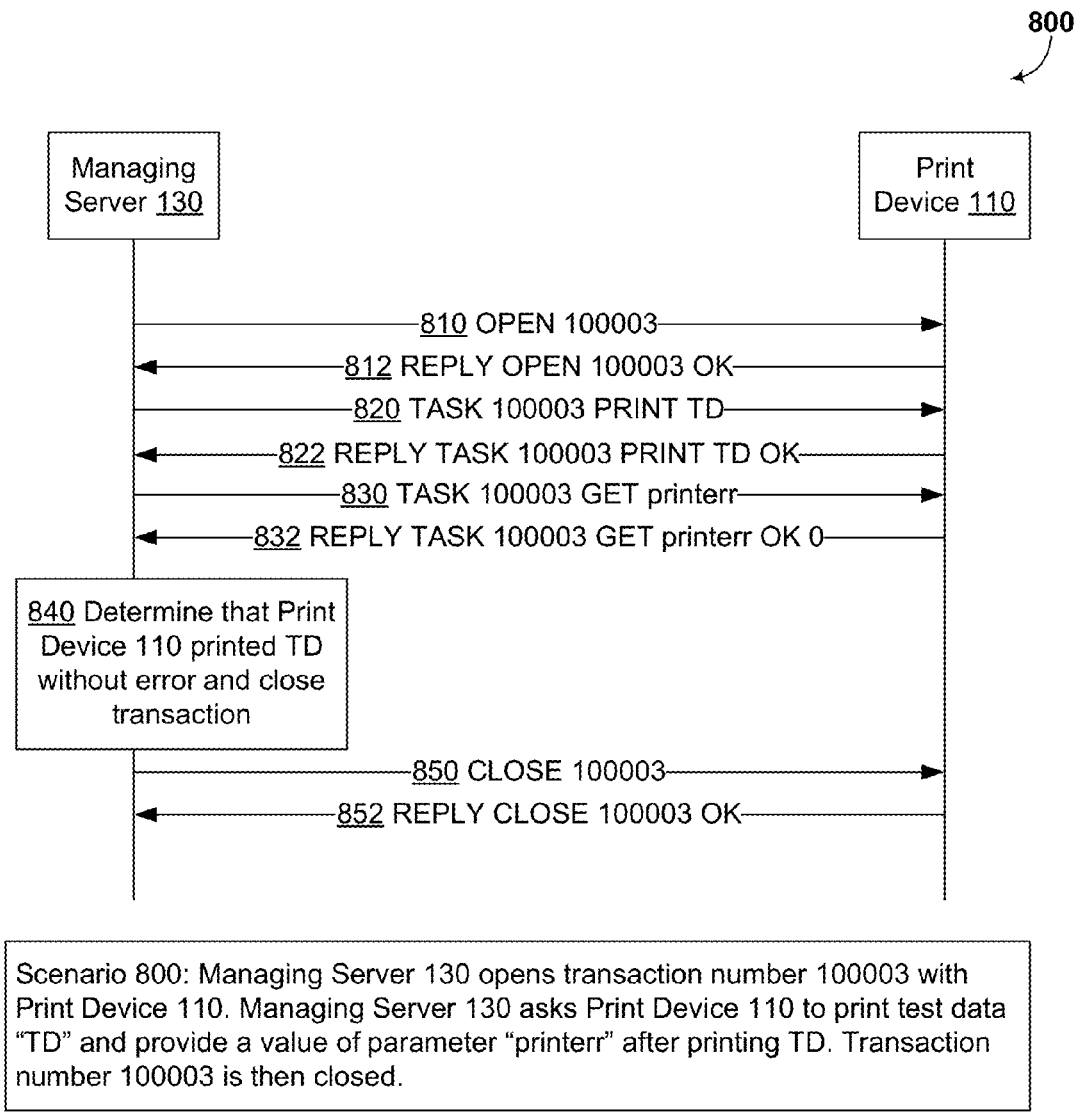
FIG. 8 is a communication flow diagram for another scenario, according to an example embodiment.

FIG. 8 is a communication flow diagram for scenario 800, according to an example embodiment. In scenario 800, managing server 130 opens transaction number 100003 with print device 110. Managing server 130 then requests that print device 110 to print test data "TD" and provide a value of printer parameter "printerr" after printing TD. Transaction number 100003 is then closed.

As shown in FIG. 8, scenario 800 begins with managing server 130 sending OPEN message 810 to print device 110 to open transaction 100003. In response to OPEN message 810, print device 110 sends REPLY message 812 indicating that transaction 100003 was successfully opened.

Managing server 130 can then send TASK message 820 to print device 110 requesting the print device 110 print test data "TD". Upon reception of TASK message 820, print device 110 can obtain test data TD from TASK message 820. In scenario 800, print device 110 successfully prints the test data. After printing the test data, scenario 800 continues with print device 110 sending REPLY message 822 to managing server 130 to indicate the test data was printed successfully.

FIG. 8 shows that scenario 800 continues with managing server 130 sending TASK message 830 to print device 110 requesting print device 110 provide a value of a "printerr" printer parameter. Upon reception of TASK message 830, print device 110 can determine that the printerr parameter has a value of 0 and send REPLY message 832 to inform managing server 130 that the printerr parameter has a value of 0 on print device 110.

In scenarios 800 and 900, a printerr value of 0 indicates no errors during the most recent print job, and any other value represents an error code for the most recent print job. At block 840, managing server 130 can use the printerr value of 0 from REPLY message 832 to determine that test data TD was printed successfully by print device 110. As test data TD was printed successfully by print device 110, managing server 130 can determine to close transaction 100003.

Scenario 800 can continue with managing server 130 sending CLOSE message 850 to print device 110 closing transaction 100003. In response to CLOSE message 850, print device 110 sends REPLY message 852 indicating that transaction 100003 was successfully closed. After REPLY message 852 is received by managing server 130, managing server 130 can close transaction 100003 and scenario 800 can end.

Figure 9:
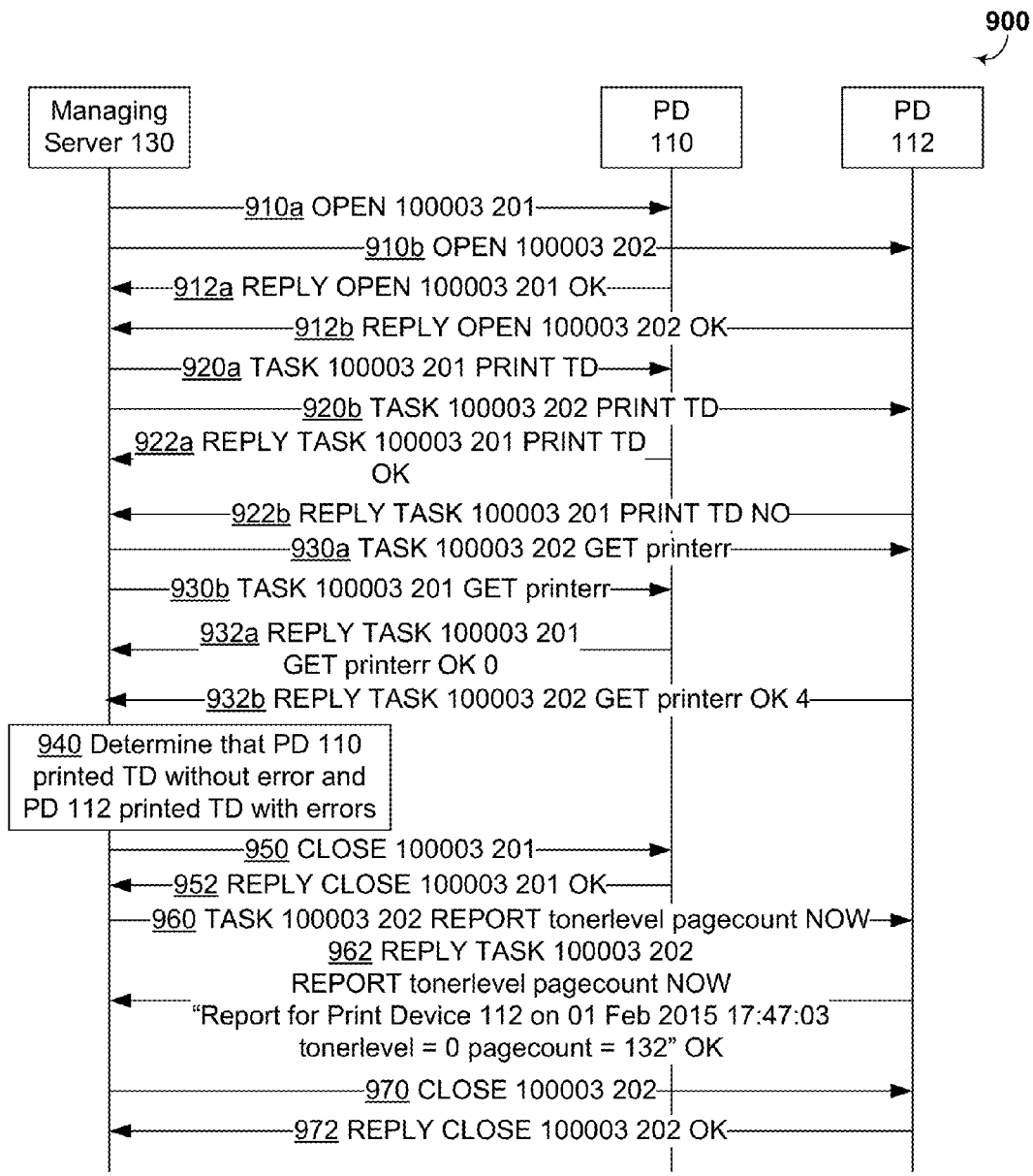
FIG. 9 is a communication flow diagram for another scenario, according to an example embodiment.

FIG. 9 is a communication flow diagram for scenario 900, according to an example embodiment. In scenario 900, managing server 130 opens channel 201 of transaction number 100003 with print device 110 and opens channel 202 of transaction number 100003 with print device 120. Managing server 130 then requests that both print devices 110 and 112 separately print test data "TD" and provide the respective values of printer parameter "printerr" for print devices 110 and 112 after printing TD. Based on the respective printerr values, managing server 130 determines that print device 110 printed TD correctly, but print device 112 did not. Managing server then requests an immediate report of "tonerlevel" and "pagecount" printer parameters from print device 112. After receiving the report, transaction number 100003 is then closed.

As shown in FIG. 9, scenario 900 begins with managing server 130 sending respective OPEN messages 910a, 910b to print devices 110, 112 to open respective channels 201, 202 of transaction 100003 between managing server 130 and respective print devices 110, 112. In response to respective OPEN messages 910a, 910b, print devices 110, 112 send respective REPLY messages 912a, 912b to managing server 110 indicating that both channels 201 and 202 of transaction 100002 were successfully opened.

Managing server 130 can then send respective TASK messages 920a, 920b to respective print devices 110, 112 requesting that each of print devices 110, 112 print test data "TD". Upon reception of respective TASK messages 920a, 920b, respective print devices 110, 112 can obtain test data TD from respective TASK messages 920a, 920 and respectively print the test data. In scenario 900, print device 110 successfully prints the test data, but print device 112 does not successfully print the test data. After printing the test data, scenario 900 continues with print device 110 sending REPLY message 922a to managing server 130 to indicate the test data was printed successfully and print device 112 sending REPLY message 922b to managing server 130 to indicate the test data was printed unsuccessfully.

FIG. 9 shows that scenario 900 continues with managing server 130 sending respective TASK messages 930b, 930a to respective print devices 110, 112 requesting respective value of the printerr parameter. Upon reception of TASK message 930b, print device 110 can send REPLY message 932a to inform managing server 130 that print device 110 has a printerr parameter value of 0. Upon reception of TASK message 930a, print device 112 can send REPLY message 932b to inform managing server 130 that print device 112 has a printerr parameter value of 4.

As mentioned above, in scenarios 800 and 900, a printerr value of 0 indicates no errors during the most recent print job, and any other value represents an error code for the most recent print job.

At block 940, managing server 130 can use the printerr value of 0 from REPLY message 932a to determine that test data TD was printed successfully by print device 110. As test data TD was printed successfully by print device 110, managing server 130 can determine to close channel 201 of transaction 100003. Managing server 130 can then send CLOSE message 950 to print device 110 closing channel 201 of transaction 100003. In response to CLOSE message 950, print device 110 sends REPLY message 952 indicating that channel 201 of transaction 100003 was successfully closed.

Also at block 940, managing server 130 can use the printerr value of 4 from REPLY message 932b to determine that test data TD was printed unsuccessfully by print device 112. As shown in FIG. 9, scenario 900 includes managing server 130 sending TASK message 960 requesting a report of the "tonerlevel" and "pagecount" printer parameters—the report is requested to be provided immediately using the keyword "NOW" in TASK message 960. Upon reception of TASK message 960, print device 112 generates a report "Report for Print Device 112 on 1 Feb. 2015 17:47:03 tonerlevel=0 pagecount=132", and sends REPLY message 962 to provide the report to managing server 130.

Managing server 130 can then send CLOSE message 970 to print device 112 closing channel 202 of transaction 100003. In response to CLOSE message 970, print device 112 sends REPLY message 972 indicating that channel 202 of transaction 100003 was successfully closed. After REPLY message 972 is received by managing server 130, managing server 130 can close transaction 100003 and scenario 900 can end.

V. Example Methods of Operation

Figure 10:
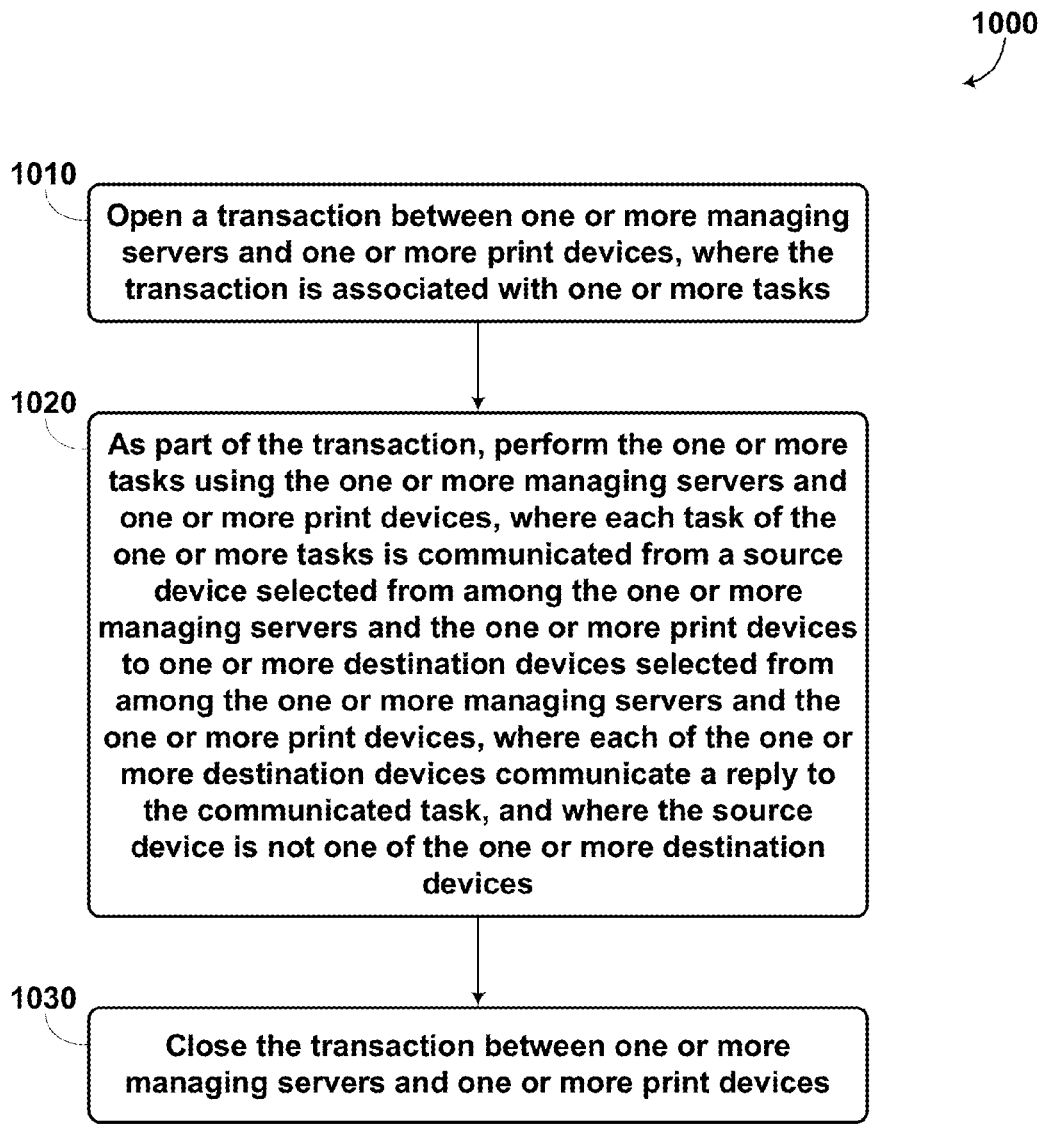
FIG. 10 shows a flowchart for a method, according to an example embodiment.

FIG. 10 shows a flowchart for method 1000, according to an example embodiment. Method 1000 can be carried out by one or more managing servers, such as one or more managing servers 130 and one or more print devices, such as one or more of print devices 110, 112, and 114. In some embodiments, one or more computing devices 200 can be configured to perform at least the herein-described functionality of a managing server and/or a print device.

Method 1000 can begin at block 1010, where a transaction between one or more managing servers and one or more print devices can be opened, where the transaction can be associated with one or more tasks, such as discussed above in the context of at least FIGS. 3-9. In some embodiments, the one or more tasks can be selected from among: a task to get information about a parameter of a destination device, a task to set a value of a parameter of the destination device, and a task to report a value of a parameter of the destination device on a periodic basis, such as discussed above in the context of at least FIG. 3.

In other embodiments, the one or more tasks are selected from among: a task to connect a destination device to a third device, a task to disconnect the destination device from the third device, a task to download data from the third device to the destination device, and a task to upload data from the destination device to the third device, such as discussed above in the context of at least FIG. 3. In particular of the other embodiments, the destination device can be selected from the one or more print devices, where the data comprises print-device software for the destination device, and where the one or more tasks are further selected from: a task to install the print-device software on the destination device, such as discussed above in the context of at least FIG. 3. In more particular of the other embodiments, the one or more tasks include the task to install the print-device software on the destination device and a task to restart the destination device, such as discussed above in the context of at least FIG. 3.

In still other embodiments, opening the transaction can include: generating a unique transaction identifier for the transaction; and generating an open transaction command that comprises the unique transaction identifier at the source device, such as discussed above in the context of at least FIGS. 3-9.

In particular of these embodiments, the one or more destination devices can include a particular destination device. Then, opening the transaction can include: determining a particular channel identifier for a channel between the source device and the particular destination device; generating a particular open transaction command that comprises the unique transaction identifier and the particular channel identifier at the source device; and sending the particular open transaction command from the source device to the particular destination device, such as discussed above in the context of at least FIGS. 3, 5, 7, and 9.

At block 1020, the one or more managing servers and the one or more print devices can, as part of the transaction, perform the one or more tasks, where each task of the one or more tasks is communicated from a source device selected from among the one or more managing servers and the one or more print devices to one or more destination devices selected from among the one or more managing servers and the one or more print devices, where each of the one or more destination devices communicate a reply to the communicated task, and where the source device is not one of the one or more destination devices, such as discussed above in the context of at least FIGS. 3-9.

In some embodiments, the destination device can be selected from the one or more print devices, and wherein the one or more tasks include a task to provide an image of a control panel of the destination device, such as discussed above in the context of at least FIG. 3. In particular of these embodiments, the destination device can be configured to store a plurality of images of the control panel. Then, the task to provide the image of the control panel can include a parameter indicating a number of stored images to be provided from the plurality of images of the control panel, such as discussed above in the context of at least FIG. 3.

At block 1030, the transaction between the one or more managing servers and the one or more print devices can be closed, such as discussed above in the context of at least FIGS. 3-9. In some embodiments, closing the transaction can include: generating a particular close transaction command that includes the unique transaction identifier and the particular channel identifier at the source device; and sending the particular close transaction command from the source device to the particular destination device, such as discussed above in the context of at least FIGS. 3, 5, 7, and 9.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   opening a transaction between one or more managing servers and one or more print devices, wherein the transaction is associated with one or more tasks
   as part of the transaction, performing the one or more tasks using the one or more managing servers and the one or more print devices, wherein each task of the one or more tasks is communicated from a source device selected from among the one or more managing servers to one or more destination devices selected from among the one or more print devices, wherein each of the one or more destination devices communicate a reply to the communicated task, and wherein the source device is not one of the one or more destination devices; and
   closing the transaction between the one or more managing servers and the one or more print devices,
   wherein the one or more destination devices comprise a particular destination device,
   wherein opening the transaction comprises:
      generating a unique transaction identifier for the transaction at the source device,
      determining a particular channel identifier for a channel between the source device and the particular destination device,
      generating a particular open transaction command that comprises the unique transaction identifier and the particular channel identifier at the source device, and
      sending the particular open transaction command from the source device to the particular destination device; and
   wherein closing the transaction comprises:
      generating a particular close transaction command that comprises the unique transaction identifier and the particular channel identifier at the source device, and
      sending the particular close transaction command from the source device to the particular destination device.

2. The method of claim 1, wherein the one or more tasks are selected from among: a task to get information about a parameter of a destination device, a task to set a value of a parameter of the destination device, and a task to report a value of a parameter of the destination device on a periodic basis.

3. The method of claim 1, wherein the one or more tasks are selected from among: a task to connect a destination device to a third device, a task to disconnect the destination device from the third device, a task to download data from the third device to the destination device, and a task to upload data from the destination device to the third device, wherein the data comprises print-device software for the destination device, wherein the one or more tasks are further selected from: a task to install the print-device software on the destination device and a task to restart the destination device.

4. The method of claim 1, wherein each task of the one or more tasks is communicated from the source device to the one or more destination devices on a predetermined schedule basis.

5. The method of claim 1, wherein the destination device is selected from the one or more print devices, and wherein the one or more tasks include a task to provide an image of a control panel of the destination device.

6. The method of claim 5, wherein the destination device is configured to store a plurality of images of the control panel, and wherein the task to provide the image of the control panel comprises a parameter indicating a number of stored images to be provided from the plurality of images of the control panel.

7. A system, comprising:
one or more print devices; and
one or more managing servers, comprising:
one or more processors; and
data storage configured to store computer-readable instructions that, when executed by the one or more processors, cause the one or more managing servers to perform functions comprising:
opening a transaction between the one or more managing servers and the one or more print devices, wherein the transaction is associated with one or more tasks;
as part of the transaction, performing the one or more tasks using the one or more managing servers and the one or more print devices, wherein each task of the one or more tasks is communicated from a source device selected from among the one or more managing servers to one or more destination devices selected from among the one or more print devices, wherein each of the one or more destination devices communicate a reply to the communicated task, and wherein the source device is not one of the one or more destination devices; and
closing the transaction;
wherein the one or more destination devices comprise a particular destination device,
wherein opening the transaction comprises:
generating a unique transaction identifier for the transaction at the source device,
determining a particular channel identifier for a channel between the source device and the particular destination device,
generating a particular open transaction command that comprises the unique transaction identifier and the particular channel identifier at the source device, and
sending the particular open transaction command from the source device to the particular destination device; and
wherein closing the transaction comprises:
generating a particular close transaction command that comprises the unique transaction identifier and the particular channel identifier at the source device, and
sending the particular close transaction command from the source device to the particular destination device.

8. The system of claim 7, wherein the one or more tasks are selected from among: a task to get information about a parameter of a destination device, a task to set a value of a parameter of the destination device, and a task to report a value of a parameter of the destination device on a periodic basis.

9. The system of claim 7, wherein the one or more tasks are selected from among: a task to connect a destination device to a third device, a task to disconnect the destination device from the third device, a task to download data from the third device to the destination device, and a task to upload data from the destination device to the third device, wherein the data comprises print-device software for the destination device, wherein the one or more tasks are further selected from: a task to install the print-device software on the destination device and a task to restart the destination device.

10. The system of claim 9, wherein each task of the one or more tasks is communicated from the source device to the one or more destination devices on a predetermined schedule basis.

11. The system of claim 7, wherein the destination device is selected from the one or more print devices, and wherein the one or more tasks include a task to provide an image of a control panel of the destination device.

12. The system of claim 7, wherein the destination device is configured to store a plurality of images of the control panel, and wherein the task to provide the image of the control panel comprises a parameter indicating a number of stored images to be provided from the plurality of images of the control panel.

13. An article of manufacture comprising a non-transitory computer readable medium configured to store computer-readable instructions that, when executed by one or more processors of one or more managing servers associated with one or more print devices, cause the one or more managing servers to perform functions comprising:
opening a transaction between the one or more managing servers and the one or more print devices, wherein the transaction is associated with one or more tasks;
as part of the transaction, performing the one or more tasks using the one or more managing servers and one or more print devices, wherein each task of the one or more tasks is communicated from a source device selected from among the one or more managing servers to one or more destination devices selected from among the one or more print devices, wherein each of the one or more destination devices communicate a reply to the communicated task, and wherein the source device is not one of the one or more destination devices; and
closing the transaction;
wherein the one or more destination devices comprise a particular destination device,
wherein opening the transaction comprises:
generating a unique transaction identifier for the transaction at the source device,
determining a particular channel identifier for a channel between the source device and the particular destination device,
generating a particular open transaction command that comprises the unique transaction identifier and the particular channel identifier at the source device, and
sending the particular open transaction command from the source device to the particular destination device; and
wherein closing the transaction comprises:
generating a particular close transaction command that comprises the unique transaction identifier and the particular channel identifier at the source device, and
sending the particular close transaction command from the source device to the particular destination device.

14. The article of manufacture of claim 13, wherein each task of the one or more tasks is communicated from the source device to the one or more destination devices on a predetermined schedule basis.

\* \* \* \* \*